C. WILLEY, Jr.
Cotton Gin.
No. 8,907.
Patented April 27, 1852.
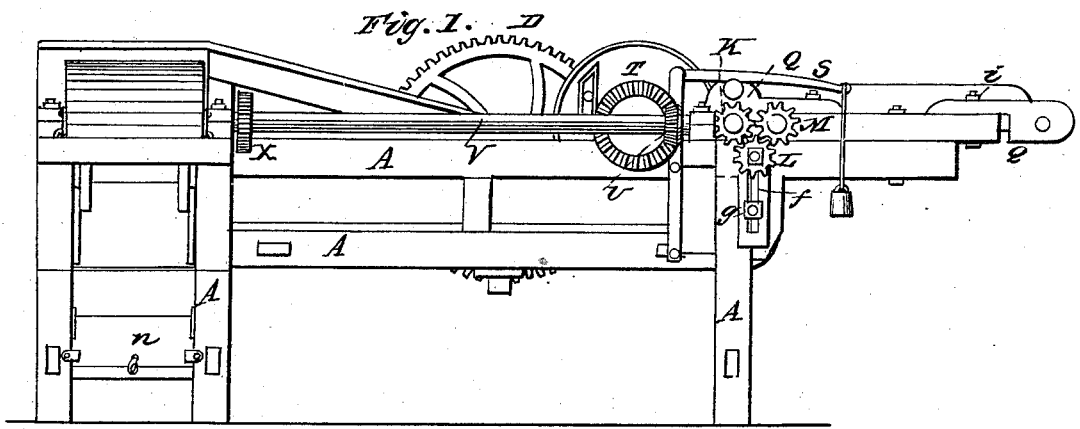
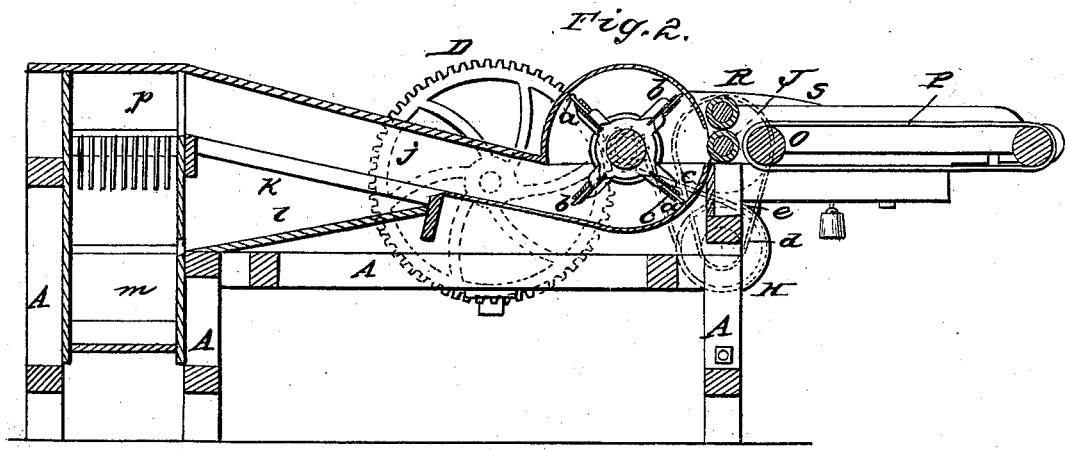
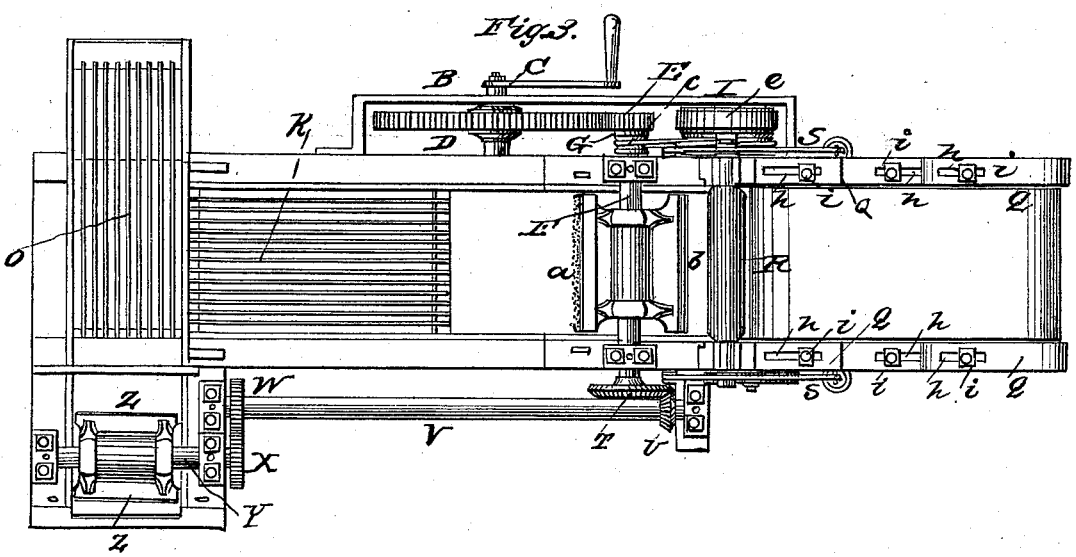

UNITED STATES PATENT OFFICE.

ANDREW I. BROWN, OF CHICAGO, AND ROBERT L. DUNLAP, OF DUNLAP'S PRAIRIE, ILLINOIS, (EXECUTORS OF THE ESTATE OF CALVIN WILLEY, JR., DECEASED,) AND URIAL WALKER, ASSIGNEES OF CALVIN WILLEY, JR., OF CHICAGO, ILLINOIS.

IMPROVEMENT IN GINS FOR LONG STAPLES OF COTTON.

Specification forming part of Letters Patent No. 8,907, dated April 27, 1852.

*To all whom it may concern:*

Be it known that I, CALVIN WILLEY, Jr., of Chicago, in the county of Cook and State of Illinois, have invented certain new and useful Improvements in Cotton-Gins for Cleaning Sea-Island Cotton; and I do hereby declare the following to be a full, clear, and exact description of the same, reference being had to accompanying drawings, making a part thereof, in which—

Figure 1 represents a view of one of the sides thereof. Fig. 2 represents a vertical longitudinal section through the machine, with a portion of the gearing (not seen in Fig. 1) in dotted lines; and Fig. 3 represents a top view with the caps removed to show the interior of the machine.

Similar letters in the several figures represent the same parts.

In the ginning of sea-island or long-fibered cotton, it has been found that the saws cannot be used without breaking or injuring the fiber of the cotton, so much so as to reduce its market value to but a little over the ordinary staple, while the same material when cleaned by hand is worth more than double the price of the common staple. Hand-cleaning is very expensive, and I have therefore devised the following apparatus for the purpose, the nature of which consists in arranging upon a rotary beater (which also serves the purpose of a fan-blower) alternate brushes of bristles or other similar material, and beaters of leather or equally elastic and durable material, to be used in combination with the rollers which feeds in and holds the cotton to be operated upon. The brushes first comb out the material which is held by the rollers, and the leather beaters knock off the seeds. The whole material is then, by the blast created by the beaters, driven over a screen, through which the seeds may fall toward the rear of the machine, where it is met by a cross-blast from a fan-blower, and which completes the separation of the fiber from the seeds, the fiber coming out on one side of the machine and the seeds on the other.

To enable others skilled in the art to make and use my invention, I will proceed to describe the same with reference to the drawings.

The frame A may be constructed in any well-known substantial manner, on one side of which I secure a bar, B, for forming a support for one end of the shaft C, upon which the main driving cog-wheel D is fixed, the other end of the shaft resting in a box on the frame. The cog-wheel D meshes into and operates a spur-wheel, E, on the end of a shaft, F, which carries the brushes $a$ and beaters $b$, they being arranged alternately on the alternate wings on said rotary beater. On said shaft F, just inside of the spur-wheel E, and between it and the frame of the machine, I arrange a pulley, G, over which runs a crossed belt, $c$, passing around a pulley, H, to which said pulley H is also attached a smaller pulley, $d$, over which runs a belt, $e$, passing around a drum, I, on the shaft of the lower feed-roller, J. To the opposite end of the lower feed-roller, J, I attach a spur-wheel, K, working into a similar gear-wheel, L, which in turn drives a spur, M, on the end of the roller O, which drives the endless apron P, for carrying up the cotton to the feed-rollers. The bearing upon which the gear-wheel L is placed is made adjustable by means of the slot $f$ and set-screw $g$, so that when the endless apron P is moved back or forth for the purpose of adjusting the feed, and which carries back and forth with it the spur-gear M, the gear L may be raised or lowered to still drive the gear M, which operates the endless apron.

The frame Q, which supports the endless apron, is made adjustable by means of the slots $h$ and set-screws $i$, so that the apron itself may be strained up to the proper tension for carrying up the cotton to the rollers, and also so that the entire frame and apron may be carried forward or back to regulate the feed of the machine, the amount to be fed in depending upon the condition and fiber of the staple.

The upper feed-roller, R, has its journals resting loosely in open boxes, and is rotated by friction. It is held down upon the material by means of the weighted levers S, which admit of its rising to accommodate itself to the material to be fed into the beaters, and prevent it from being fed in too rapidly. The rollers J and R should both be covered with cloth, leather, gum-elastic, or gutta-percha, or other equally-suitable material that will hold the cotton sufficiently tight to allow the fiber to be combed out, and yet sufficiently soft and elastic not to crush the seeds while passing between them.

On the end of the shaft F is arranged a bevel gear-wheel, T, which works into a bevel-gear, U, on a shaft, V, arranged alongside and outside of the machine. To the extreme opposite end of the shaft V is arranged a spur-wheel, W, which meshes into a spur-wheel, X, on the end of a shaft, Y, which carries the fan-blower Z, which may be constructed in any of the well-known forms of making machines for creating a blast of air.

After the cotton is separated from the seeds by the brushes and beaters before described, the blast created by the rotation of said beaters, which works under a cap and draws in the air through eyes around the shaft thereof at each end, drives it through the inclined chamber j, in the bottom of which is arranged longitudinal bars k, forming a screen through which the seeds may drop onto an inclined board, l, from whence it passes into a chamber, m, and is let out of the machine by means of the door n, which should be kept shut during the operation of ginning or cleaning to keep the blast within the machine. After the cotton and such seeds as may not have dropped through the screen k are driven out of the chamber j by the blast from the beaters, they are met by a cross-blast from the fan-blower Z, which also aids to separate the fiber from the seeds, the seeds dropping through a screen, o, in the bottom of the chamber p, thence into the chamber m, where the seeds from the chamber j are conveyed, and from which they are removed, as above stated. The inclination of the chambers j and p tends to hold the material back, so as to allow the blast to separate the fiber from the seed which has already been loosened by the brushes and beaters, and not to carry it out before the blast. The cross-blast for changing the direction of the passing material catches the fiber, which is the lightest, and draws it from the seed, which, being the heaviest, is the slowest to be operated upon, and which, by its own weight, when the cotton is separated from it, will drop through the screens.

Having thus fully described the nature of my invention, what I claim therein as new, and desire to secure by Letters Patent, is—

1. Regulating the feed of a cotton-gin for ginning sea-island cotton by means of an endless apron which may be set to or from the feed-rollers to suit the quality of the staple and the quantity to be fed in to be cleaned, and still be driven by the same mechanical movement, substantially as herein described.

2. In combination with the covered feed-rollers which receive the material from the apron and carry it into the machine, the series of alternate brushes and elastic beaters on the same shaft for combing out the fiber and knocking off the seed while it is still held by said rollers, as herein substantially set forth and described.

3. In combination with the inclined chamber j, through which the material is driven by the blast from the wings of the beaters, the inclined chamber p, having a cross-blast through it from the fan-blower Z, to complete the entire separation of the fiber and the seed, both chambers being provided with screens, substantially in the manner and for the purpose herein fully set forth and described.

CALVIN WILLEY, JR.

Witnesses:
 JOHN D. CLARK,
 WASHINGTON NAILOR.